United States Patent
Guillaud et al.

(10) Patent No.: US 7,942,339 B2
(45) Date of Patent: May 17, 2011

(54) BANK CARD WITH A USER ACTUATABLE SWITCH

(75) Inventors: Philippe Guillaud, Los Angeles, CA (US); Cyril Lalo, Los Angeles, CA (US); François Droz, Corcelles (CH)

(73) Assignee: NagraID Security SA, Le Crêt du Locle (CH)

( * ) Notice: Subject to any disclaimer, the term of this patent is extended or adjusted under 35 U.S.C. 154(b) by 50 days.

(21) Appl. No.: 12/498,768

(22) Filed: Jul. 7, 2009

(65) Prior Publication Data
US 2010/0258638 A1    Oct. 14, 2010

(30) Foreign Application Priority Data

Apr. 9, 2009  (EP) .................................. 09005232

(51) Int. Cl.
*G06K 19/06* (2006.01)
(52) U.S. Cl. ........ 235/492; 235/375; 235/380; 235/382; 235/382.5; 235/487; 235/494
(58) Field of Classification Search .......... 235/375, 235/380, 382, 382.5, 451, 487, 492, 494
See application file for complete search history.

(56) References Cited

U.S. PATENT DOCUMENTS

| | | | |
|---|---|---|---|
| 5,049,874 A * | 9/1991 | Ishida et al. | 340/7.39 |
| 5,478,994 A * | 12/1995 | Rahman et al. | 235/380 |
| 5,627,355 A | 5/1997 | Rahman et al. | |
| 6,904,526 B1 * | 6/2005 | Hongwei | 713/182 |
| 2002/0047049 A1 * | 4/2002 | Perron et al. | 235/492 |
| 2006/0266831 A1 | 11/2006 | Kozlay | |
| 2008/0308641 A1 * | 12/2008 | Finn | 235/492 |
| 2009/0200371 A1 * | 8/2009 | Kean et al. | 235/379 |

OTHER PUBLICATIONS

Search Report issued in corresponding European application No. EP09005232, completed Sep. 8, 2009.

* cited by examiner

*Primary Examiner* — Thien M. Le
*Assistant Examiner* — Tuyen K Vo
(74) *Attorney, Agent, or Firm* — Griffin & Szipl, P.C.

(57) ABSTRACT

An electronic card includes an element for transmitting a signal to a user of the electronic card, an electronic unit, an electric energy source, a switch actuatable by a user of the electronic card and an application introduced into the electronic unit. The electronic unit includes an element for detecting actuation of the switch, arranged for determining whether the actuation ends within a first time interval from the start of actuation ($t_0$), the end of the first time interval occurring after transmission ($t_1$) of a signal perceptible to the card user, or for determining whether the switch actuation ends within a second time interval (T2max) from the start of transmission ($t_1$) of the user perceptible signal, the application being actuated or the actuation thereof being validated when the detection element has detected the end ($t_2$) of the switch actuation within the first time interval or the second time interval.

6 Claims, 1 Drawing Sheet

BANK CARD WITH A USER ACTUATABLE SWITCH

This application claims priority from European Patent Application No. 09005232.5 filed Sep. 4, 2009, the entire disclosure of which is incorporated herein by reference.

FIELD OF THE INVENTION

Bank cards with a switch that may have, in a general case, the function of actuating the card circuit and/or a digital display of the card or, in a particular case, the function of starting a given program implemented in the card, particularly a secure identification procedure, are already known. It will be noted that, in several applications, the general case and the particular case can be combined, since actuating the power supply of the electronic circuit incorporated in a card automatically starts a secure identification algorithm in order to perform a certain transaction, particularly a banking transaction.

BACKGROUND OF THE INVENTION

A bank card is known, in particular from U.S. Pat. No. 5,627,355, which is incorporated herein by reference, that includes a switch actuatable by a sort of push-button or a deformable zone of the card, so that the exertion of pressure in the zone of the card containing the switch starts a specific secure identification algorithm. This card further includes at least one digital display for displaying in series various personal identification numbers, or PIN codes. This card also includes an electronic unit and an electric power source associated with a solar cell arranged on the surface of the card. This type of card can be used in various services, whether for making telephone calls from public telephones, a service for downloading films from the Internet, or accessing a bank or postal account, particularly so as to perform various transactions, such as the payment of bills.

The identification program provided in U.S. Pat. No. 5,627,355 consists in storing a list of PIN codes in the card, generated uniquely for a given client, the same list being stored in the bank's server. Each time the card is actuated by the switch, a new personal code is selected in the list and displayed. This selection generally consists in taking the next unused code from the pre-established list. The user has to enter the code in the machine or computer that transmits it to the server. The server checks that the code is actually the next unused code in the list for the client in question. This is known as a "one time password" or OTP. The importance of maintaining synchronisation between the position in the card list and the position in the server's list is thus clear. If codes in the card list are used without being transmitted to the server, particularly when the card is inadvertently actuated, the code transmitted during the next transaction with the server will not match the next unused code in the server's list. U.S. Pat. No. 5,627,355 mentions a method for partially overcoming this problem, via comparison with a code sequence in the server's list so as to detect any loss of synchronisation and thus re-establish the match between the two lists. This method can only be limited to a short sequence, particularly for security reasons. Consequently, if several codes are wasted in the card, the system will no longer accept the codes supplied by the client. Then, even if the match is regularly updated, usable codes are wasted and there is thus a smaller number of possible transactions for a given list stored in the card. The card will thus be used up more quickly. Finally, another drawback connected to this problem arises from the fact that inadvertent actuations of the card result in a wasteful increase in the consumption of the electric energy stored in the card.

In general, a first switch actuation of a card of the type described above is for initialising the application. Next, each new cycle is started by each new actuation of the switch. The problem connected to inadvertent actuations of the switch and thus of the secure identification program concerns not only the card user, who, for example, places the card in a wallet in his back trouser pocket and who, when sitting down, may sometimes unintentionally actuate the card switch, but also production steps during which pressure is exerted on the card, particularly when outer layers are added by laminating or printing steps. Thus, when the client receives a new card, it may have already consumed a certain number of personal identification numbers. If this number is higher than that tolerated by the system that manages the application, the client then receives a defective card which does not work. This situation is evidently detrimental for the service supplier and causes difficulties for clients.

SUMMARY OF THE INVENTION

It is an object of the present invention to provide an electronic card with a switch that can be actuated by a user and that overcomes the aforementioned problem.

The present invention therefore concerns an electronic card including means for transmitting a signal to the electronic card user, an electronic unit, an electric energy source, a switch that can be actuated by a user of the electronic card and an application introduced into said electronic unit, characterized in that it further includes means for detecting actuation of said switch, arranged to determine whether the actuation ends within a first time interval from the start of actuation, the end of this first time interval occurring after transmission of a signal that is perceptible to the card user, or to determine whether the switch actuation ends within a second time interval from transmission of said user perceptible signal, said application being actuated or actuation thereof validated when said detection means have detected the end of said switch actuation within said first time interval or said second interval.

It will be clear that the aforementioned application actuation may consist in executing an end part of the program associated with the application, during which, in particular, the final application execution result is provided. Likewise, validated actuation of the application may only mean that an incremental counter, for defining which is the next OTP code to be provided to the user, has been incremented. If the actuation is not validated, the incremental counter is not incremented.

According to the invention, at least one determined time parameter of the user switch actuation signal is checked to authorise execution of the application or a cycle thereof to validate such execution in the electronic card. More specifically, in accordance with the invention, the card supplies the user with a signal after the user has actuated the switch. The signal gives the user information that indicates explicitly or implicitly that he can stop actuating the switch, in particular by releasing the pressure exerted on a push-button or deformable zone of the card associated with the switch. The user's brain, which receives this perceptible signal generated by the card, normally reacts within a certain, relatively short time interval.

The method of actuating a given application by actuating a switch of the electronic card checks whether the switch actuation ends either in a first time interval from the start of the switch actuation, inside which a user perceptible signal is transmitted, or in a second time interval from the start of transmission of said user perceptible signal. It will be noted that the operating principle of the two variants is equivalent, since the deadline for generating the return signal to the user, who is actuating the switch, is generally at least approximately determined. If this deadline is determined, the two variants are identical if the duration of the first interval is equal to that deadline plus the duration of the second interval.

It should be noted that this electronic card actuation method could also apply to powering some part of the electronic unit and to powering the display so as to limit as far as possible the electrical power consumption of the card. One could thus provide that only a standby circuit is permanently powered, and this circuit is arranged to detect at least a first actuation signal from the switch. One could also provide that actuation of the switch, after the card has entered inactive mode, actuates the power supply to one part of to the entire electronic unit which, as soon as it is powered, detects and processes the actuation signal from the switch to determine whether it corresponds to an actuation signal for said application as a function of a user perceptible signal.

The user perceptible signal, generated by the electronic card to inform the user that he can end the switch actuation, can be famed by a signal of various nature, in particular a visual or acoustic signal. The visual signal can be provided by a light emitting diode or by a digital display.

Owing to the features of the invention, prolonged pressure on the switch, particularly during laminating in manufacture, can be prevented from causing actuation of the application in question. Since the reaction time of a typical user of the card is relatively short, it is possible to validate only switch actuations that end within a short time interval after the user perceptible signal has been sent. Thus, at least most of the unintentional actuation signals linked to typical actions or behaviour of the conventional user will be ruled out. It is thus ensured that the application is only started essentially by deliberate actuation by the electronic card user.

BRIEF DESCRIPTION OF THE DRAWINGS

Embodiments of the invention will be described below with reference to drawings, given by way of non-limiting examples, which are annexed to the present description and in which.

DETAILED DESCRIPTION OF THE PREFERRED EMBODIMENTS

Figure 1:
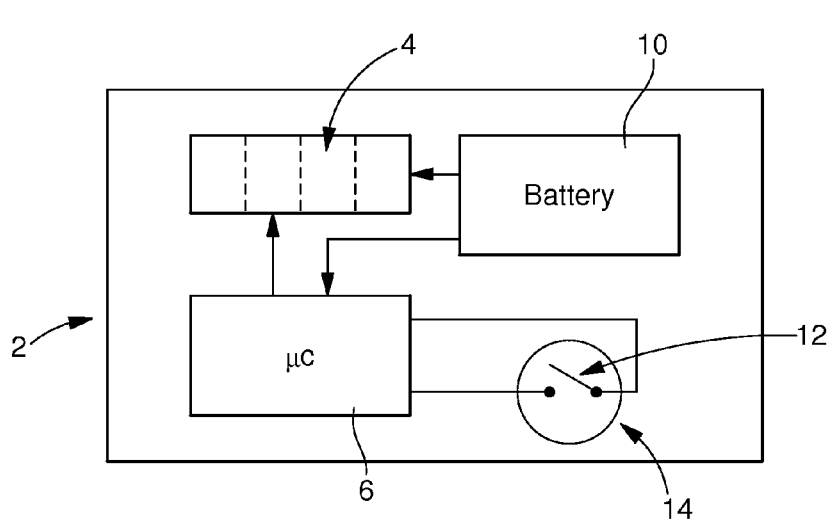
FIG. 1 shows schematically the architecture of an electronic card according to the invention.

FIG. 1 shows an electronic card 2 including a digital display 4, an electronic unit 6, a battery 10 and a switch 12 that can be actuated by an electronic card user. The switch is integrated in the card and associated with a sort of push-button 14 or an elastically deformable zone of the card, and, when pressure is exerted in the deformable zone or on the push-button, the switch is actuated. Actuation of the switch is detected by actuation detection means associated with means for controlling an application introduced into the electronic card. These detection means and control means can themselves be actuated when the start of switch actuation is detected, causing at least the detection means to be powered. It will be noted that, in the example of FIG. 1, electronic unit 6 is formed by a microprocessor, which defines the aforementioned detection means and the control means. Other embodiments with electronic circuits respectively dedicated to these detection means and control means can be provided within the scope of the present invention.

In particular, the application considered consists of a secure card user identification program associated with a system connected to the server of a service supplier. The program generates or reads personal one-time passwords (OTP) in a memory of the card. Each time the application is started, the application displays on display 4 a new code that the user must then introduce into an apparatus or computer connected to a service provider server.

The detection means are arranged for detecting actuation of said switch 12, particularly via the closure thereof, and for determining whether the actuation corresponds to a pulse that has a certain time relation with a user perceptible signal generated by the card in response to actuation of said switch. If this is the case, the application is actuated or the actuation thereof is validated. In particular, the application displays the personal identification code to be used for the next transaction, which forms said user perceptible signal. The electronic card starts the application (its initial actuation or execution of a cycle of said application or an algorithm for a program defining the application) as soon as the switch actuation starts and then displays a message or said code for the user. The initial actuation or said displayed code are only validated if the pulse from the switch (defining an actuation signal) ends shortly after digital display 4 of the card starts to display a message or code. In the opposite case, the display means are de-actuated quickly, and, where necessary, the displayed code is considered unused (not consumed). The display means are preferably actuated simultaneously with actuation of said application. They remain in an active state for a certain period, allowing the user to introduce the code displayed in the system associated with the card prior to being de-actuated again.

Figure 2:
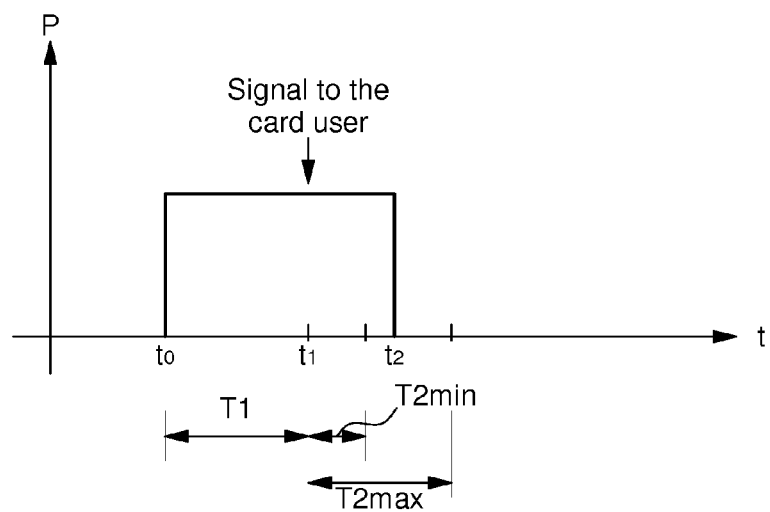
FIG. 2 shows the time profile of an actuation signal for an integrated application in the electronic card in accordance with a first envisaged variant.

According to a first embodiment of the invention, which is described with reference to FIG. 2, the means for detecting actuation of switch 12 and the means for controlling an application programmed in card 2 are arranged for determining whether such switch actuation ends within a predetermined time interval starting from transmission of said user perceptible signal (signal to the user). The application is actuated or its actuation is validated when the detection means have detected the end of said switch actuation within the predetermined time interval. This first embodiment is provided, in particular, for initial actuation of the electronic card application, which may take a certain period of time. In an initial actuation, the signal to the user may be a message ('OK', 'READY', 'STOP') displayed on the digital display or the display of a first personal code to be used for a first transaction. In a case where the internal operations of the card could last a non-negligible period of time, it will be noted that the user perceptible signal inviting him to end switch actuation may be, in a variant, the end of an initial message ('PRESS', 'KEEP', 'WAIT') displayed while said internal operations are carried out. When this initial message ends, the user knows that he can then stop actuating the switch. In order to confirm switch actuation, the user must stop actuating the switch within a given time interval.

Actuation of the switch starts at time $t_0$. After a certain time period T1, a user perceptible signal is given at time $t_1$. Time T1 must be of variable duration here. However, in practice, T1 is generally determined by internal operations whose duration is defined by the operation of the electronic card. As soon as said signal is displayed, a time counter measures the time that elapses until switch actuation ends at time $t_2$. If the time interval exceeds a maximum duration T2max, the counter can stop measuring the time since the actuation signal received is not considered valid, i.e. as being deliberately given by the card user. If the switch actuation does not end before deadline T2max, the actuation is considered invalid by the electronic card, which does not therefore take it into account. According to a variant of the invention, a signal received from the switch is validated only if the corresponding pulse also ends after a minimum period T2min. T2min is selected to be less than the typical reaction time of a user seeing the visual signal via the digital display.

Figure 3:
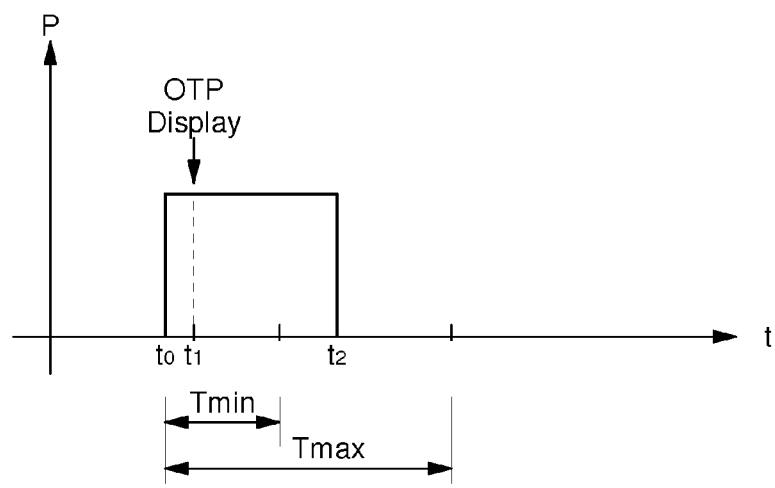
FIG. 3 shows the time profile of an actuation signal for an integrated application in the electronic card in accordance with a second envisaged variant.

According to another embodiment of the invention described with reference to FIG. 3, the switch actuation detection means count the time that elapses from the start of actuation. In parallel, the application is executed and a signal is rapidly transmitted to the user, who must then stop actuating the switch. This situation concerns, in particular, any new execution of the application to obtain an OTP code so as to perform a new transaction. The signal may be directly the display of the OTP code, or another message preceding display of the code. Indeed, it may be preferred not to display the OTP prior to determining whether the switch actuation is actually valid. Thus, the switch is actuated at time $t_0$ and the return signal for the user, inviting him to end the switch actuation pulse, is provided at time $t_1$, relatively close to $t_0$. The detection means are arranged for determining whether the actuation ends within a certain time interval from the start of actuation, and the end of this time interval occurs after transmission of a signal perceptible to the card user. According to the invention, the actuation pulse must end at a time $t_2$ corresponding to a pulse length that is less than Tmax. Solely by way of example, the length of Tmax may be one or two seconds. Time $t_1$ occurs before Tmax has expired.

According to a variant of this embodiment, the length of the actuation pulse is greater than a minimum duration Tmin, which is, however, greater than duration $t_1-t_0$ to guarantee that the user perceptible signal is emitted before Tmin.

Those skilled in the art can select other variants within the scope of the present invention, without departing from the basic principle of the invention.

What is claimed is:

1. An electronic card including means for transmitting a signal to a user of said electronic card, an electronic unit, an electric energy source, a switch actuatable by the user of the electronic card and an application introduced into said electronic unit, wherein the electronic unit further includes means for detecting actuation of said switch, arranged for determining whether said actuation ends within a first time interval from the start of actuation, the end of said first time interval occurring after transmission of a signal perceptible to the card user on a digital display, or for determining whether said switch actuation ends within a second time interval from the start of transmission of said user perceptible signal, said application being actuated or the actuation thereof being validated when said means for detecting actuation of said switch have detected the end of said switch actuation within said first interval or said second interval.

2. The electronic card according to claim 1, wherein said switch is associated with a push-button or with an elastically deformable zone of the electronic card.

3. The electronic card according to claim 1, wherein said application is a secured personal identification program using one time passwords, which are displayed by said digital display.

4. The electronic card according to claim 1, wherein said user perceptible signal corresponds to the start of the display of a message or to the end of the display of said message.

5. The electronic card according to claim 1, wherein said user perceptible signal corresponds to the display of a one-time personal password.

6. The electronic card according to claim 1, wherein said means for detecting actuation of said switch are further arranged for determining whether said actuation ends after a minimum time period, from the start of actuation or from the start of transmission of said user perceptible signal, the end of this minimum time period occurring after transmission of a signal perceptible to the card user, said application being actuated or the actuation thereof being validated when said means for detecting actuation of said switch have also detected the end of said switch actuation after said minimum time period.

* * * * *